United States Patent
Schmidt et al.

(10) Patent No.: US 10,805,105 B2
(45) Date of Patent: Oct. 13, 2020

(54) METHOD FOR OPERATING A SERVICE SYSTEM

(71) Applicant: NEC Europe Ltd., Heidelberg (DE)

(72) Inventors: Mischa Schmidt, Heidelberg (DE); Anett Schuelke, Gaiberg (DE)

(73) Assignee: NEC CORPORATION, Tokyo (JP)

( * ) Notice: Subject to any disclaimer, the term of this patent is extended or adjusted under 35 U.S.C. 154(b) by 155 days.

(21) Appl. No.: 15/577,350

(22) PCT Filed: Mar. 18, 2016

(86) PCT No.: PCT/EP2016/055997
§ 371 (c)(1),
(2) Date: Nov. 28, 2017

(87) PCT Pub. No.: WO2017/157465
PCT Pub. Date: Sep. 21, 2017

(65) Prior Publication Data
US 2018/0159697 A1    Jun. 7, 2018

(51) Int. Cl.
*H04L 12/28* (2006.01)
*G05B 15/02* (2006.01)
*G05B 19/042* (2006.01)

(52) U.S. Cl.
CPC .......... *H04L 12/2821* (2013.01); *G05B 15/02* (2013.01); *G05B 19/042* (2013.01); *G05B 19/0421* (2013.01); *G05B 2219/2614* (2013.01); *G05B 2219/2642* (2013.01); *G05B 2219/32328* (2013.01)

(58) Field of Classification Search
CPC ... H04L 12/2821; G05B 15/02; G05B 19/042; G05B 19/0421; G05B 2219/2614; G05B 2219/2642; G05B 2219/32328
See application file for complete search history.

(56) References Cited

U.S. PATENT DOCUMENTS

| | | | |
|---|---|---|---|
| 7,031,793 B1 | 4/2006 | Jenkins et al. | |
| 8,615,312 B2 | 12/2013 | Colombo | |
| 9,696,055 B1 * | 7/2017 | Goodman | G05D 23/1932 |

(Continued)

FOREIGN PATENT DOCUMENTS

| | | |
|---|---|---|
| WO | WO 2009050674 A1 | 4/2009 |
| WO | WO 2011131753 A1 | 10/2011 |

(Continued)

*Primary Examiner* — Thomas C Lee
*Assistant Examiner* — Charles Cai
(74) *Attorney, Agent, or Firm* — Leydig, Voit & Mayer, Ltd.

(57) ABSTRACT

A method for operating one or more service systems performed in a memory of an analyzing entity (AE) includes a) receiving, by an input interface of the AE, one or more control requests for controlling one or more resources of at least one of the one or more service systems; b) assessing, by the AE, an impact on the one or more service systems of the one or more control requests by checking an effect on already performed control requests for resources of the one or more service systems when the one or more control requests would be performed on one or more of the resources of the at least one of one or more service systems; and c) checking, by the AE, if the assessed impact violates one or more adverse situation rules (ASR).

13 Claims, 5 Drawing Sheets

(56) References Cited

U.S. PATENT DOCUMENTS

| | | | |
|---|---|---|---|
| 2005/0192713 A1* | 9/2005 | Weik | G06Q 50/188 |
| | | | 700/295 |
| 2011/0035229 A1 | 2/2011 | Colombo et al. | |
| 2013/0041478 A1* | 2/2013 | Ploix | G05B 15/02 |
| | | | 700/9 |
| 2013/0232267 A1 | 9/2013 | Shatzkamer et al. | |
| 2015/0198345 A1 | 7/2015 | Bicknell | |
| 2017/0102683 A1* | 4/2017 | Bharti | G05B 19/0428 |

FOREIGN PATENT DOCUMENTS

| | | |
|---|---|---|
| WO | WO 2013171234 A1 | 11/2013 |
| WO | WO 2014124353 A1 | 8/2014 |

\* cited by examiner

METHOD FOR OPERATING A SERVICE SYSTEM

CROSS REFERENCE TO RELATED APPLICATIONS

This application is a U.S. National Stage Application under 35 U.S.C. § 371 of International Application No. PCT/EP2016/055997 filed on Mar. 18, 2016. The International Application was published in English on Sep. 21, 2017 as WO 2017/157465 A1 under PCT Article 21(2).

FIELD

The present invention relates to a method for operating a service system. The present invention further relates to a computing entity. Even further the present invention relates to a non-transitory computer readable medium storing a program, causing a computer to execute a method for operating a service system.

BACKGROUND

Conventional building management systems (BMS), also referred to as building control or building automation systems (these terms are interchangeably used in this application) are modeled in a three layer architecture comprising a management layer as to which monitoring and control systems are associated an automation layer to which controllers, gateways or the like are associated and a field layer to which sensors, actuators or the like are associated.

The management layer enables human interaction and configuration in daily operation. This top layer communicates with automation level gateway devices e.g. via ModBus, M-Bus, EEB, BACnet/IP or OPC protocols to access information from sensing and actuation devices. Typically conventional management level systems are referred to as SCADA. SCADA-like systems are applicable to controlling various kinds of service provisioning systems. Such systems provide specific services to requestors, e.g. heating, ventilation, cooling, water, etc. and are denoted "service systems" in the following. Service systems may share resources, e.g. a gas boiler may provide thermal energy supply to heating systems and hot water systems inside a single building. Thus service systems may be inter-dependent. Service systems may also be inter-dependent due to other reasons, e.g. the physical layout of the building: a room cooled by air conditioning may share a wall with a room being heated. Service systems' behaviors are controlled by the BMS automation and field layers under guidance of the management layer.

BMS have usually a large amount of different sensors, actuators and controllers. Operators of a BMS try to enhance the efficiency of the service systems to save costs, etc.

The specific optimization of a single service system (e.g. a heating, ventilation and air-conditioning system HVAC) or e.g. a single area (e.g. floor or single office area) with respect to one or more defined key performance indicators KPI lacks the consideration of side effects on other systems or areas of the entire building and can have adverse impacts on total energy consumption or other applications' KPIs. In the EU FP-7 research projects CAMPUS21 and BaaS, the developed supervisory single system heating control optimizations are examples of specialized conventional applications using a networked BMS via a standardized request interface.

In a conventional SCADA setting, human staff's changes to the operational parameters of a single system, e.g. the HVAC supply temperatures, can have effects on other areas. The effects of changes are hard to predict even for expert users. For example a change to a system operation schedule or an adaptation of a supply temperature set-point curve can have significant effects on other systems by unforeseen interdependencies.

In conventional building management settings, SCADA systems have configured with permissible ranges of allowed control parameters and use credentials to protect against changes of configuration or control pattern. However these ranges are set statically and do not dependent on the operational context. Due to this conventional systems are over-dimensioned subject to a so-called coincidence factor describing the probability of coinciding requests/demands. If operational reality deviates from this, resource shortages occur. The dimensioning of service systems due to coincidence factor is a trade-off: conservative estimates ensure operations but come at the cost of over dimensioned systems while optimistic estimates run the risk of frequent shortages and conflicts.

For instance an installed boiler capacity of a building is dimensioned by a peak load of different heat consuming systems (HVAC, space heating, hot water, potentially special systems like grass heating) expected to coinciding at most. As system configurations change, usage patterns and weather change, as well as refurbishment measures, e.g. replacement of boilers or heat exchangers over the lifetime of a building, situations can arise where the expected coincidence does not match reality anymore. Two negative scenarios can be conceived:

1.) In case the heat supply capacity is insufficient, adverse effects or conflicts on all or only a subset of the systems are expected. Typically, these systems will react with increases in demand (e.g. by indicating increased system supply temperatures resulting in increased heat exchanger valve openings on the overall supply circuit) worsening the overall heating situation further.
2.) In situations where the installed heat supply peak capacity is just sufficient, the boiler may run outside of maximum efficiency operation ranges.

In particular thermal systems such as space heating, hot water and cooling typically have much flexibility: e.g. indoor temperature controls usually aim at staying within a target temperature band (e.g. 20° C.±1° C.). Further by varying supply temperature set points they have flexibility in energy consumption and duration of operation.

In WO2013/171234 conflicts are detected and resolved by distributed orchestration engines hosted in e.g. PLC components. They detect that multiple conflicting requests have been received. The detected conflicts are communicated on a so-called service bus and are resolved by SCADA or Manufacturing Execution Systems (MES).

In U.S. Pat. No. 8,615,312 an orchestration engine is defined based on High Level Petri Nets (HLPN) defining the orchestration engine behavior to orchestrate service oriented service systems. No conflicts are resolved.

In US20110035229 also covers orchestration of services offered by service-oriented automation components of a manufacturing facility from one manufacturing level to a higher level such as the corporate, business and/or production level. No conflict resolution is described.

In US20130232267 resource requests in a communication network are resolved by applying policies to network flows based on the aggregated resource availability, e.g. using priorities and admitting or rejecting flows completely.

Further in U.S. Pat. No. 7,031,793 a method for conflict resolution is described among a plurality of controllers. By adapting the control instructions, e.g. based on mathematical models in a multi-tiered architecture conflicts are detected and resolved.

Even further in the non-patent literature of Ruta, M.; Scioscia, F.; Loseto, G.; Di Sciascio, E., "Semantic-Based Resource Discovery and Orchestration in Home and Building Automation: A Multi-Agent Approach," in Industrial Informatics, IEEE Transactions on, vol. 10, no. 1, pp. 730-741, February 2014 doi: 10.1109/TII.2013.2273433 a multi agent based conflict mediation and resource orchestration on the agent level for building domotics is described between a home agent and a device agent. Conflicts for newly received requests are negotiated on the agent level and based on utility expressions defined upon service preferences, i.e. if one agent's requests directly interfere with another agent's preferences.

SUMMARY

In an embodiment, the present invention provides a method for operating one or more service systems, the method being performed in a memory of an analyzing entity (AE). The method includes a) receiving, by an input interface of the AE, one or more control requests for controlling one or more resources of at least one of the one or more service systems; b) assessing, by the AE, an impact on the one or more service systems of the one or more control requests by checking an effect on already performed control requests for resources of the one or more service systems when the one or more control requests would be performed on one or more of the resources of the at least one of one or more service systems; c) checking, by the AE, if the assessed impact violates one or more adverse situation rules (ASR), wherein an ASR violation represents a situation of the service system in which at least partly contradicting effects on one or more resources of the one or more service systems would occur due to a performance of the one or more control requests; d) upon violation of one or more ASR, computing, by the AE to reduce violation of the one or more ASR, one or more adapted control requests for one or more of the control requests and/or one or more of the already performed control requests; e) negotiating, by the AE, with requestors of the one or more of the control requests and/or the one or more of the already performed control requests, the computed adapted control requests until acceptance is achieved, wherein the negotiating includes one or more recomputed adapted control requests; and f) upon acceptance, transmitting, by the AE, the accepted control requests via an output interface to recipients of the control requests.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide systems and methods that can increase efficiency of service systems. Embodiments of the present invention further provide systems and methods that avoid or at least reduce effects of colliding requests on system resources of a service system as well as interdependent service systems, if present. Furthermore, embodiments of the present invention provide systems and methods that avoid misconfigurations caused, for example, by human configuration errors of the service system.

Although applicable to any kind of management system, embodiments of the present invention will be described with regard to managing resources of building service systems controlled by building management systems (BMS).

In an embodiment the present invention provides a method for operating one or more service systems, said method performed in a memory of an analyzing entity, 'AE', comprising the steps of:
 a) receiving, by an input interface of said AE, one or more control requests for controlling one or more resources of at least one of the said one or more service systems,
 b) assessing, by said AE, the impact on said one or more service systems of said one or more control requests by checking the effect on already performed control requests for resources of said one or more service systems when said one or more control requests would be performed on one or more of the resources of said at least one of the said one or more service systems,
 c) checking, by said AE, if said assessed impact violates one or more adverse situation rules, 'ASR', an ASR violation representing a situation of the one or more service systems in which at least partly contradicting effects on one or more resources of said one or more service systems would occur due to a performance of said one or more control requests,
 d) upon violation of one or more ASR, computing, by said AE, one or more adapted control requests for one or more of said control requests and/or one or more of said already performed control requests, said computing being directed to reduce violation of said ASR,
 e) negotiating, by said AE, with requestors of said one or more of said control requests and/or said one or more of said already performed control requests, said computed adapted control requests, said negotiating can include one or more recomputed adapted control requests, until acceptance is achieved,
 f) upon acceptance, transmitting, by said AE, the accepted control requests via an output interface to recipients of said control requests.

In a further embodiment, the present invention provides a computing entity, comprising an input interface for receiving one or more control requests for controlling one or more resources of at least one of one or more service systems, an output interface for transmitting accepted control requests to recipients of said control requests, computation means comprising a processor and a memory, being adapted to receive from said input interface one or more control requests for controlling one or more resources of said at least one of one or more service systems, to assess the impact on said one or more service systems of said one or more control requests by checking the effect on already performed control requests for resources of said one or more service systems, when said one or more control requests would be performed on one or more of the resources of said at least one of one or more service systems, to check if said assessed impact violates one or more adverse situation rules, 'ASR', an ASR violation representing a situation of the one or more service systems in which at least partly contradicting effects on one or more resources of said one or more service systems would occur due to a performance of said one or more control requests, upon violation of one or more ASR to compute one or more adapted control requests for one or more of said control requests and/or one or more of said already performed control requests, said computing being directed to reduce violation of said ASR, to negotiate with requestors of said one or more of said control requests and/or said one or more of said already performed control requests, said computed adapted control requests, said negotiating can include one or more recomputed adapted control requests, until acceptance is achieved, and upon acceptance, to transmit the accepted control requests via said output interface to recipients of said control requests.

In an even further embodiment, the present invention provides a non-transitory computer readable medium storing a program causing a computer to execute a method for operating one or more service systems, the method comprising the steps of:

a) Receiving one or more control requests for controlling one or more resources of at least one of the said one or more service systems b) Assessing the impact on said one or more service systems of said one or more control requests by checking the effect on already performed control requests for resources of said one or more service systems, when said one or more control requests would be performed on one or more of the resources of said at least one of the one or more service systems, c) Checking if said assessed impact violates one or more adverse situation rules, 'ASR', an ASR violation representing a situation of the one or more service systems in which at least partly contradicting effects on one or more resources of said one or more service systems would occur due to a performance of said one or more control requests, d) Upon violation of one or more ASR, computing one or more adapted control requests for one or more of said control requests and/or one or more of said already performed control requests, said computing being directed to reduce violation of said ASR, e) Negotiating with requestors of said one or more of said control requests and/or said one or more of said already performed control requests, said computed adapted control requests, said negotiating can include one or more recomputed adapted control requests, until acceptance is achieved, f) Upon acceptance, transmitting the accepted control requests via an output interface to recipients of said control requests.

The term "control request" can be used to refer to data or information in the form of packets, messages, etc. indicating a request for changing, applying, operating, etc. changes on operating or performing resources.

The term "negotiating" refers in particular in the claims, preferably in the specification for example to at least one "round" of steps: proposing an amendment of a control request, evaluating the proposed amended control request, feedback of the evaluated control request, and proposing a further amendment of the amended control request if applicable or accept the proposed amended control request.

Then, e.g. re-amending the amended control request or accepting the proposed amended request, etc. can be performed. Further, the term "negotiating" can be used to refer to collaboratively agreeing on a control request or an amended control request.

The term "contextual information" can refer to information which may be relevant and/or may be have an impact and/or may be helpful, etc. for operating said service system. Contextual information can be for example day of the week, weather parameters or information queried from service systems, sensors, actuators, etc.

The term "behavior" in connection with "service system" can be used to refer to changes, amendments, deviations or the like in the operational performance of the automation system or service system, for example a change in technical operational parameters like temperature, power consumption, or the like or non-technical operational parameters like costs for energy supply, water supply, quality of experience for users of the service system, etc.

For assessing the impact on said service system, operational parameters representing behavior of said automation system and/or contextual information can be evaluated. This enables a high precision when assessing the impact of control requests on a service system.

Said operational parameters and/or said contextual information can be provided by a neural network and/or a database. This allows e.g. in case of a database to provide said contextual information in a fast and reliable way.

For determining said ASR violation energy consumption constraints like peak load thresholds or the like can be evaluated. This enables one of the important characteristics of service systems to be considered, not only having an impact on the physical behavior of the services but also on the non-physical behavior regarding the costs of energy consumption and thus avoiding a waste of energy.

An ASR can be provided in form of a logical expression of one or more conditions of said one or more service systems which are not permissible. This provides an easy and user-friendly way to provide ASRs. For example an explicit logical expression of a condition that is not permissible in combination can be for example space heating supply >50° C. and hot water >70° C.

For at least step b) and/or step d) described above, sensor information of sensors and actuator information of actuators of resources of said one or more service systems can be provided. This allows an even more precise assessment of the impact of different control requests on the resources of the said one or more service systems.

Said sensor information and said actuator information can include energy consumption information of said resources. This allows in an easy and reliable way to assess the impact of control requests concerning the energy behavior of the service system.

Steps c)-f) described above can be performed for an already admitted control request in predefined time intervals and/or periodically. This allows to examine the admitted one or more control requests repeatedly against the ASRs and to adapt the operation, for example in case of weather changes or the like.

Said operation parameters can be evaluated dynamically. Operational parameters like peak capacity can then be derived dynamically, for example as function of service system sensor information and/or actuator information, external information services or special services. This enables for example to track degradations in the efficiency of certain resources to restrain the demand to stay within an optimal predefined efficiency operation band of the service system.

For determining a violation of one or more ASR, effects of different control requests can be weighted against each other. This allows in a very flexible way to determine a violation.

Said weights can be dependent on the time a request is already admitted or on a value of an operational parameter on which said request has an impact or weights are determined based on external information. For example when said weights are dependent on the time a request is already admitted, this enables to "penalize" long standing requests so that they are more likely to be candidates for modification. If the weights are changed for example anti-proportional to the period of time a control request is being served, newer control requests will become modified stronger than already served requests.

An algebra can be computed to identify possible valid adaptations to control requests. This allows in an easy and reliable way to use only logic service system conditions being expressed in said algebra which enable to identify possible modifications to all control requests so that no ASR is violated.

Relative importance rankings can be determined and used during and for said negotiation. This enables to enhance flexibility since amendments to control requests or the control requests as a whole can be assigned to priority values so that corresponding amendments to the control request are performed according to the priorities.

Figure 1:
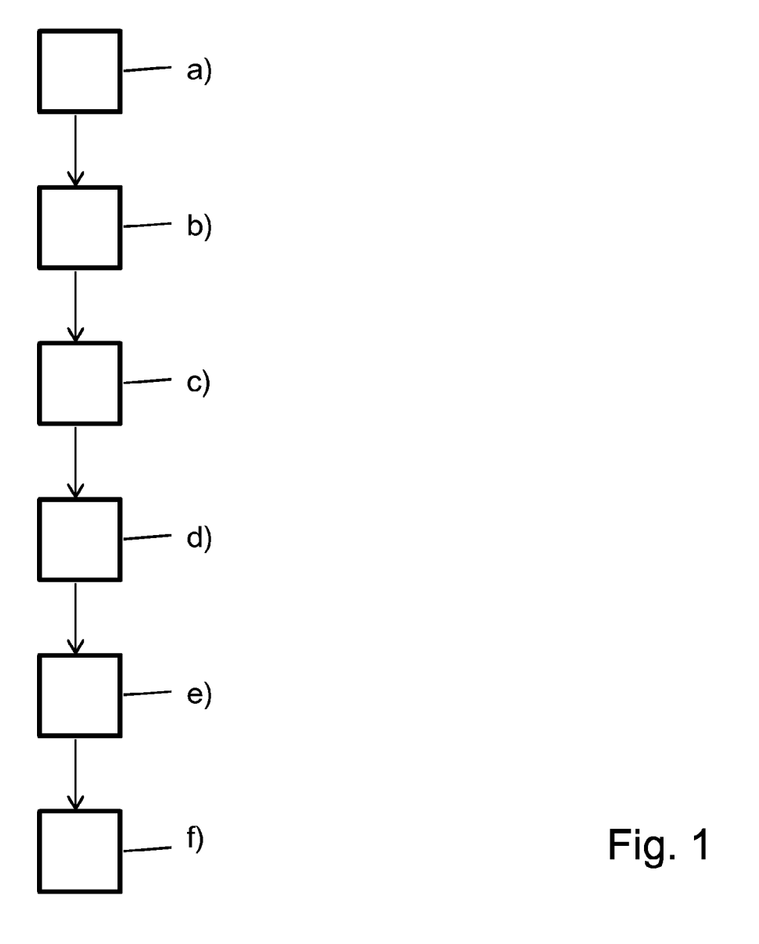
FIG. 1 shows steps of a method according to an embodiment of the present invention.

FIG. 1 shows steps of a method according to an embodiment of the present invention. In FIG. 1 a method for operating one or more service systems is shown. Said method performed in a memory of an analyzing entity, 'AE', comprising the steps of:
a) receiving, by an input interface of said AE, one or more control requests for controlling one or more resources of at least one of said one or more service systems,
b) assessing, by said AE, the impact on said one or more service systems of said one or more control requests by checking the effect on already performed control requests for resources of said one or more service systems when said one or more control requests would be performed on one or more of the resources of said at least one of one or more service systems,
c) checking, by said AE, if said assessed impact violates one or more adverse situation rules, 'ASR', an ASR defining a situation of the said one or more service systems in which at least partly contradicting effects on one or more resources of said one or more service systems would occur due to a performance of said one or more control requests,
d) upon violation of one or more ASR, computing, by said AE, one or more adapted control requests for one or more of said control requests and/or one or more of said already performed control requests, said computing being directed to reduce violation of said ASR,
e) negotiating, by said AE, with requestors of said one or more of said control requests and/or said one or more of said already performed control requests, said computed adapted control requests, said negotiating can include one or more recomputed adapted control requests, until acceptance is achieved,
f) upon acceptance, transmitting, by said AE, the accepted control requests via an output interface to recipients of said control requests.

Figure 2:
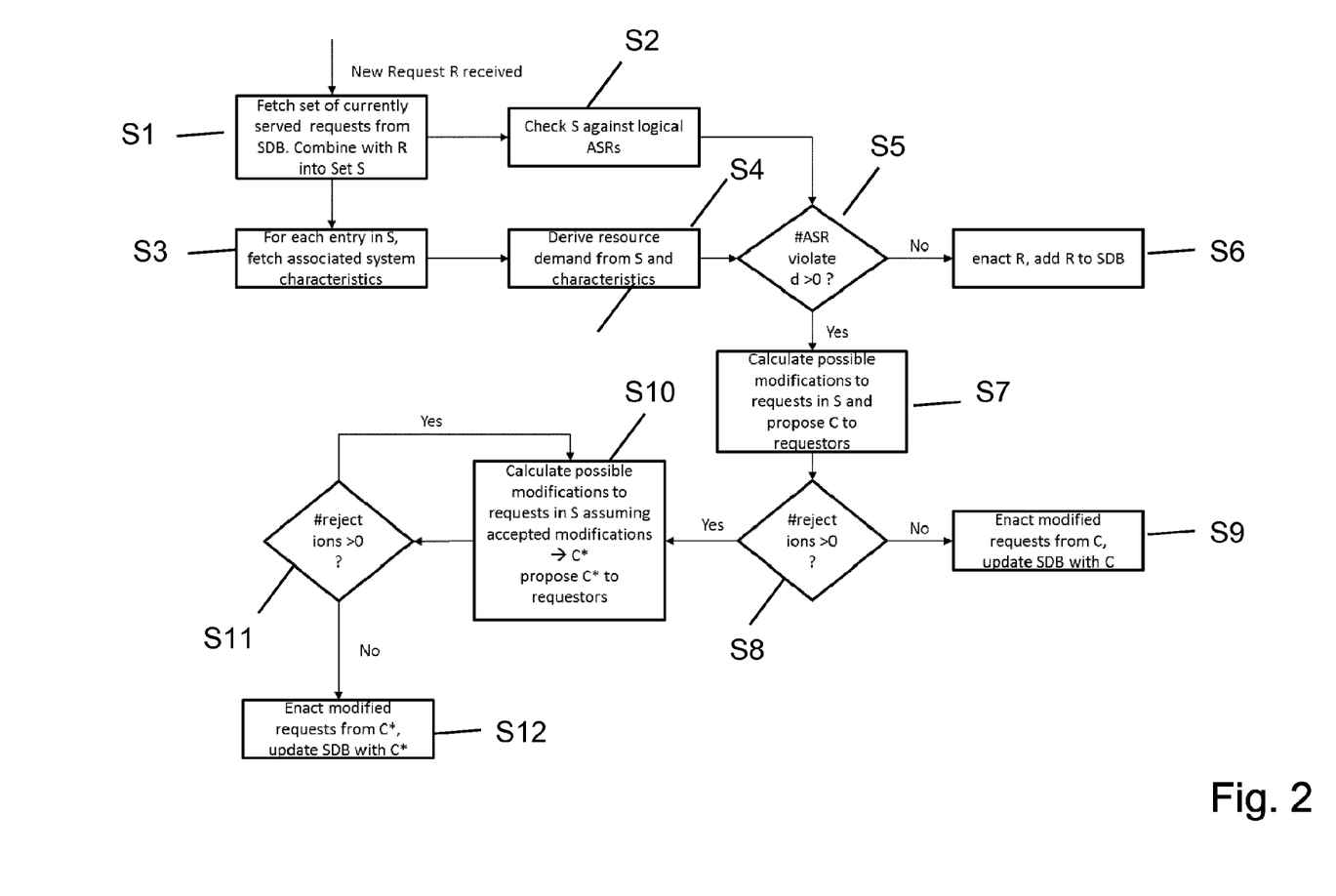
FIG. 2 shows steps of a method according to a further embodiment of the present invention.

FIG. 2 shows steps of a method according to a further embodiment of the present invention. In FIG. 2 a flow chart of a so-called context aware resource mediation and negotiation for automation systems, 'CARMENAS', is shown. According to an embodiment the so-called CARMENAS interchangeably used for a system and a method—means here Context Aware Resource Mediation and Negotiation for automation systems—monitors control requests from so-called requestors towards the automation infrastructure and compares the already served requests in combination with a newly received request against rules defining adverse situations. In case one or more of the adverse situation rules, 'ASR', are violated, it will be checked if a reduction of one or more of the requests being already served and the newly received could prevent ASR violation. If at least one combination of reductions can be constructed/computed, these will be communicated for approval to the respective requestors. If agreed by the requestors, the modified requests are enacted.

Since applications have various ways of meeting their KPIs—e.g. a heating system can heat longer at lower temperatures or heat in burst with higher temperature to maintain target indoor temperatures, the negotiation makes it possible for the applications to adapt their decisions.

To perform this concept, CARMENAS is configured with system characteristics for service (e.g. Heating) and shared resource systems (e.g. boiler) systems and with rules indicating adverse situations.

In the following an example for building systems characteristics is given: a space heating system may consume 20 kW if run at 50° C. supply temperature and 30 kW if run at 55° C. The representation of these characteristics can be e.g. in the form of a table for all discrete values of operational parameters, or can be in the form of a function based on an analytical or regression model. Resources of said system can be identified by one or more set points identifiers controlling them.

In a further embodiment the system characteristics may depend on contextual information, e.g. day of week, weather parameters or from information CARMENAS queries or receives from the service systems, e.g. via the BMS or SCADA systems. In general, the system characteristics can be provided or obtained by learning approaches, system databases, configuration by human staff and/or be derived from building and system schematics.

The ASR can be formulated in the form of constraints, e.g. energetic constraints evaluated based on system characteristics and permissible peak load, e.g. sum of system demands derived from requests is greater than defined peak capacity and/or as explicit logical expressions of conditions that are not permissible in combination, e.g. space heating supply >50° C. and hot water>70° C.

CARMENAS's adverse situation rules ASR can be used to accommodate:
  Detection of demand exceeding maximum supply
  Detection of demand exceeding desired load, e.g. to stay within maximum efficiency bands of boilers (i.e. sum of system demands derived from requests is smaller than defined desirable minimum load)
  Detection of demand undercutting desired minimum load, e.g. to stay within maximum efficiency bands of boilers
  Detection of counteracting effects, e.g. Cooling and Heating systems affecting the same building space.

The CARMENAS method and system can use or be provided with sensor and actuator information for the different service systems consuming energy, e.g. space heating, hot water, HVAC, and the energy generation systems, e.g.

the boiler and distribution systems, e.g. the main heating branch to be able to track and adapt to the real building situation. Further the CARMENAS method and system can also access external information such as weather data, weather forecast data, calendar and scheduling information.

CARMENAS can act in pre-defined time intervals without a trigger of an external request. This allows to examine the admitted requests repeatedly against the ASRs and adapt operation e.g. in the case of weather changes and can be useful when context specific system characteristics are used.

In a further embodiment ASR conditions such as the peak capacity can also be derived dynamically, e.g. as functions of service system sensor and actuator information, external information sources and/or special services. This way, e.g. degradations of boiler efficiency can be tracked to restrain the demand to stay within the optimal efficiency operation band of the building energy supply system.

ASRs can also be given a relative importance rating to distinguish between rules expressing preferred situations from rules capturing critical conditions.

In all cases of ASR violation CARMENAS can report the detection of an adverse situation, its internal state of running systems and/or admitted requestors for diagnostic purposes.

To provide adapted requests a determination logic can be used, e.g. performed on a computing device. Said determination logic to adapt requests upon ASR violation may be as follows: It is assumed here that at the time of receiving request $R_i$ from requestor A, other requests $R_1 \ldots {}_{i-1}$ are already being served. If admitting $R_i$ will result in violating one or more ASRs:

$$\min\left(\sum w_i * \Delta R_i\right) \forall\, i$$

subject to

ASR_check( ) == FALSE $\Delta Ri + \text{mod}(R_i) = R_i \forall\, i$ where $\Delta Ri$ describes the change to request $R_i$, $\text{mod}(R_i)$ describes $R_i$ after this change. $f(\text{mod}(R_i))$ describes the system energy consumption if the modified Ri is being employed and $w_i$ is a configurable weighting factor that can be set in relation to the building system pertaining to the $R_i$.

In a further embodiment the configured weights are rescaled based on the relative system priorities so that $\Sigma w_i = 1$ and ASR_check is a logical (boolean) to check all modified $R_i$ against all configured ASRs.

If weights are set equally, this tries to minimize requests' set point changes and will penalize larger consumers. By changing the weights $w_i$, priorities of systems can be encoded according to the systems' importance in the overall operation.

In another embodiment the $w_i$ are increased with the time $R_i$ being already active or by associated system's total energy consumption due to $R_i$ so that requests that long standing requests are more likely to be candidates to modification. By changing $w_i$ anti-proportional to the period of time $R_i$ is being served, newer requests can become modified stronger than already served requests.

In another embodiment the determination of weights $w_i$ can depend on additional information received from external information sources (e.g. weather services) or service system information received from relevant sensors or actuators CARMENAS queries via the SCADA/BMS system. This adaptation of $w_i$ might be a system characteristic function encoding e.g. increasing the system's $w_i$ the further the system is away from its control target. This way, systems presently close to their control target are more prone to request modifications.

For example, for the peak capacity constraint, a corresponding ASR is violated if $\Sigma f(\text{mod}(R_i))$ greater than defined peak capacity, where $f(\text{mod}(R_i))$ denotes the energy consumption of the system affected by modified $R_i$—which can be derived from the configured system characteristics.

In a further embodiment, if no energetic constraint ASR is specified and/or additionally or alternatively logical system conditions can be expressed in an algebra which be used to identify the possibly viable modifications to all $R_i$ so that no ASR is violated. For this the following logic can identify possible modifications to some of the $R_1 \ldots R_i$:

1. Extract for each violated logical ASR the logical components evaluating to TRUE for the different i.e. indicating a violation of the ASR component. Aggregate the $R_i$ causing the ASR violations into a candidate set C along with the related ASR components.
2. Calculate the required minimum modification of the requests in the set C to change the evaluation of the associated components to FALSE. Store these candidate modifications for the negotiation phase.

Once one or more viable modifications are determined by the CARMENAS system the requestors affected by the modifications are contacted with proposed modifications. If all affected requestors agree, the modified requests are communicated to the service systems. The CARMENAS system stores information on the modified $R_i$ (and the requestors).

If one or more requestors object the modification, the CARMENAS system can be configured with the following one or more procedures, which can be combined:

a) If multiple candidate modifications for the same requestor have been conceived, contact the requestor with another candidate modification
b) re-run the modification logic assuming the confirmed request modifications (which potentially will be further modified) in addition to the requests for which the corresponding requestors denied the suggested modifications. Then the CARMENAS system will again contact the requestors for the respective newly derived request modifications for their acceptance.
c) re-run the modification logic assuming the confirmed request modifications (which potentially will be further modified) and remove the requests for which the corresponding requestors denied the suggested modifications from the modification logic evaluation. Then the CARMENAS system will again contact the requestors for the respective newly derived request modifications for their acceptance.
d) enforce the proposed modifications despite the objection, e.g. for lower priority service systems. This requires a configuration of the CARMENAS system with system priorities.
e) deny the new request $R_i$ Option a) can be repeated multiple times until all requestors accept the proposed modifications. To prevent endless loops of objections, the CARMENAS system can execute options b) or c) after a) configured number of iterations.

In another embodiment a request modification similar in nature to choosing $w_i$ depending on the $R_i$ are already being served first the newest incoming request $R_i$ is considered to be modified in case of ASR violation. If this is not acceptable to the requestor, only then the standard logic to modify requests is executed. This way, requests served for long time are less likely to be modified.

In another embodiment ASRs are given relative importance ratings as indicated above, and these ratings are used in the negotiation rounds in relation to step a) above:

In the first determination of request modification, all preferred and critical ASRs are considered in ASR_check to determine the proposed modifications After receiving less than a minimum required acceptance rate by the requestors to proposed modifications of their respective requests, ASR_check is modified in its behavior to consider only critical ASRs, ignoring preferred ASRs in determining the modification proposals.

In FIG. 2 a possible flow chart of multiple negotiation rounds with rejected modifications is shown. Variations such as priorities of ASR, priority of systems, enforcement are not shown. Also not shown is interval based invocation and context awareness.

In FIG. 2 when a new request R is received the set of currently served requests if fetched from a state database SDB. The new request R is included into the fetched set S in a first step S1. In a second step S2 said set S is checked against logical adverse situation rules. In a further step S3 after step S1 associated system characteristics for each entry in the set S are fetched and in a fourth step S4 resource demand is derived from the set S and the associated system characteristics. In a fifth step S5 it is checked whether one or more other adverse situation rules are violated and if not in a six step S6 the request R is enacted and the request R is added to the set S stored in the state database SDB.

If one or more ASRs are violated then in a seventh step S7 possible modifications to the requests in the set S are calculated/computed and the modifications/modified requests included into a set C are proposed to the requestors.

In an eighth step S8 it is checked whether there are rejections or not. If there are no rejections then in an ninth step S9 the modified requests from the set C are enacted and the database SDB is updated with said set C.

If there are rejections then in a tenth step S10 possible modifications to the request in the set S are calculated/computed assuming accepted modifications resulting in a set C*. This set C* is proposed to the requestors. Then in an eleventh step S11 it is checked whether there are still rejections for this amended set C*or not. If there are no rejections then in a twelfth step S12 a modified request from said set C* are enacted and the database SDB is updated with said set C*. If there are rejections then step S10 is performed again and further step 11 etc.

Figure 3:
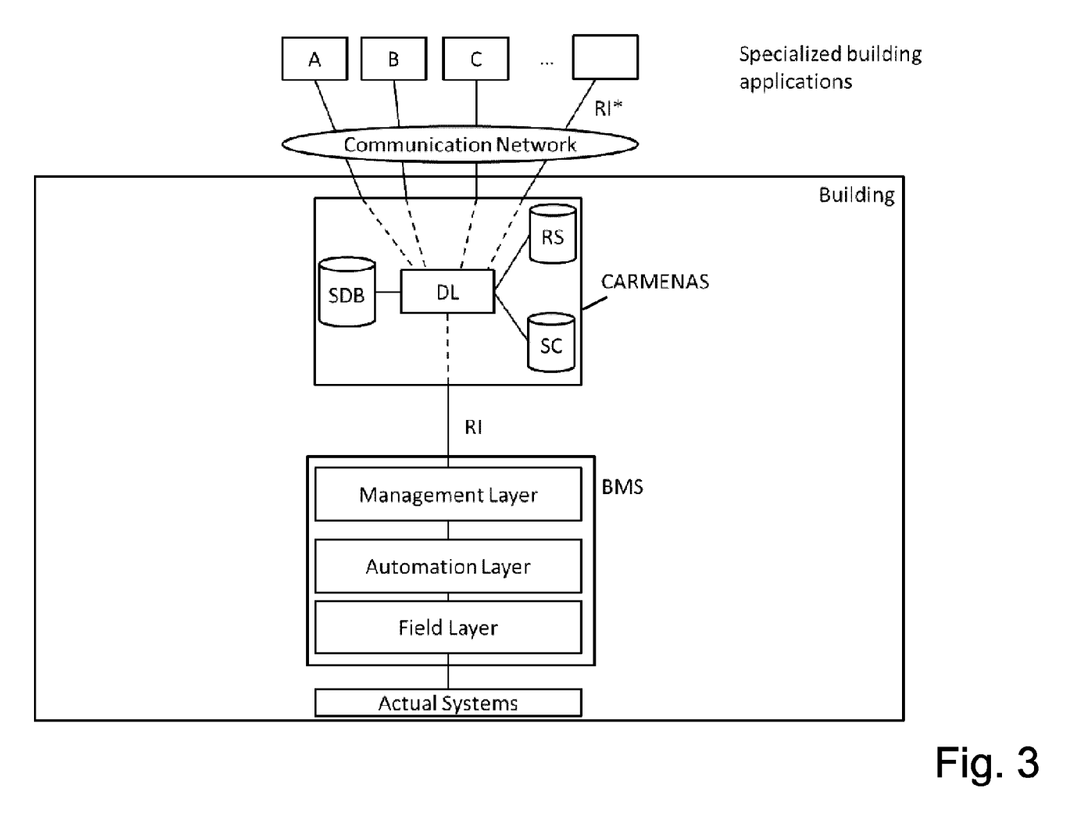
FIG. 3 shows a system according to an embodiment of the present invention.
Figure 4:
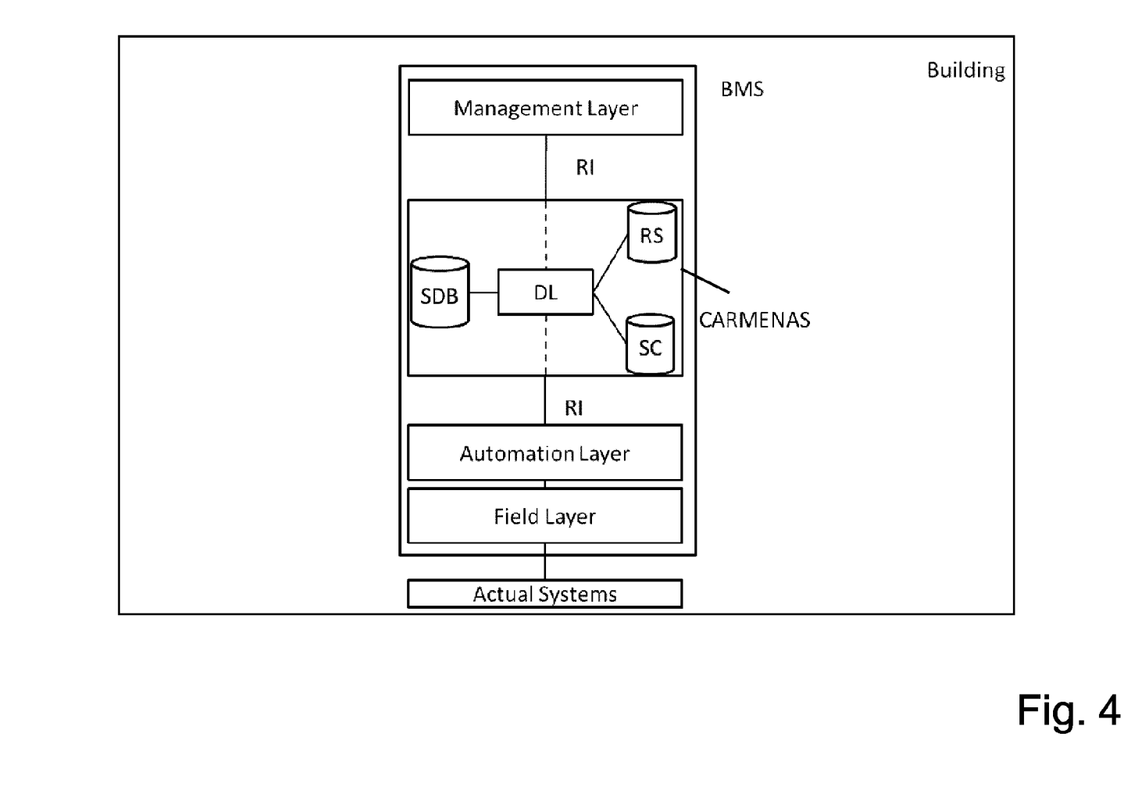
FIG. 4 shows a system according to a further embodiment of the present invention.

FIG. 3 shows a system according to an embodiment of the present invention and FIG. 4 shows a system according to a further embodiment of the present invention. In FIGS. 3 and 4 an example for BMS situations, e.g. to account for sub-optimal human configuration changes, is shown, the CARMENAS system being installed between a management level and an automation level. In case expert applications are deployed on top of the management layer, either remotely via a wide area communication network or within the building, the CARMENAS system can alternatively be installed on the interface between the management layer and the application(s) to prevent inappropriate requests even reaching the BMS at all. Both deployments/embodiments also apply to requests initiated by human staff, e.g. changing set points or schedules of heating systems.

If installed on top of management layer, the CARMENAS system will receive control or actuation requests from requestors (specialized building applications deployed inside the building or outside in a cloud setting), e.g. switching the space heating ON with a supply temperature of 70° C.

The following situations can happen if this request was to be accepted based on the active system requests already accommodated and the associated building system characteristics:

1.) No adverse situation rule ASR is violated: the request is accepted and passed on to the lower layers in the architecture as usual. The CARMENAS system updates its internal state to reflect the consumption just admitted and confirms the request to the requestor. It remembers the requestor.

2.) One or more adverse situation rules ASR are violated, e.g. because other systems are already using enough energy so that accepting the request would result in an adverse situation: The CARMENAS system will, based on the system consumption characteristics of the currently consuming systems and the requesting system try to modify the request to not violate the adverse situation rules as specified above.

FIG. 3 depicts CARMENAS's deployment in the specialized building application setting using a networked deployment. Here the applications are shown Application's Requests and CARMENAS modifications are exchanged via the Request Interface (RI*) transmitted over a Communication Network, e.g. the Internet. CARMENAS instructs admitted or modified requests to the BMS via the request interface (RI). Generally, RI* and RI can use different protocols. Without loss of generality, these specialized applications might also be deployed within the building premises.

In FIG. 4 it is shown how the CARMENAS system or entity can be deployed within building deployments. The CARMENAS system is placed here on the interface between management layer and automation layer and monitors the control requests issued by the management layer. These requests might be triggered by instructions received from specialized applications on top of the management layer. If a legacy protocol on RI does not support negotiation of requests. Then the CARMENAS system does not require management layer consent to modify requests received on RI or to modify existing requests in the database SDB to accommodate a new request R. Modified and unmodified requests are passed on via the RI interface to the automation layer. If the RI interface protocol supports messages towards the management layer, the CARMENAS system rejects the actuation request with an appropriate error code. Subsequent data queries of the Management Layer to the Automation Layer will detect the modified, enforced actuation value. The CARMENAS system can also reject requests received on RI completely.

Figure 5:
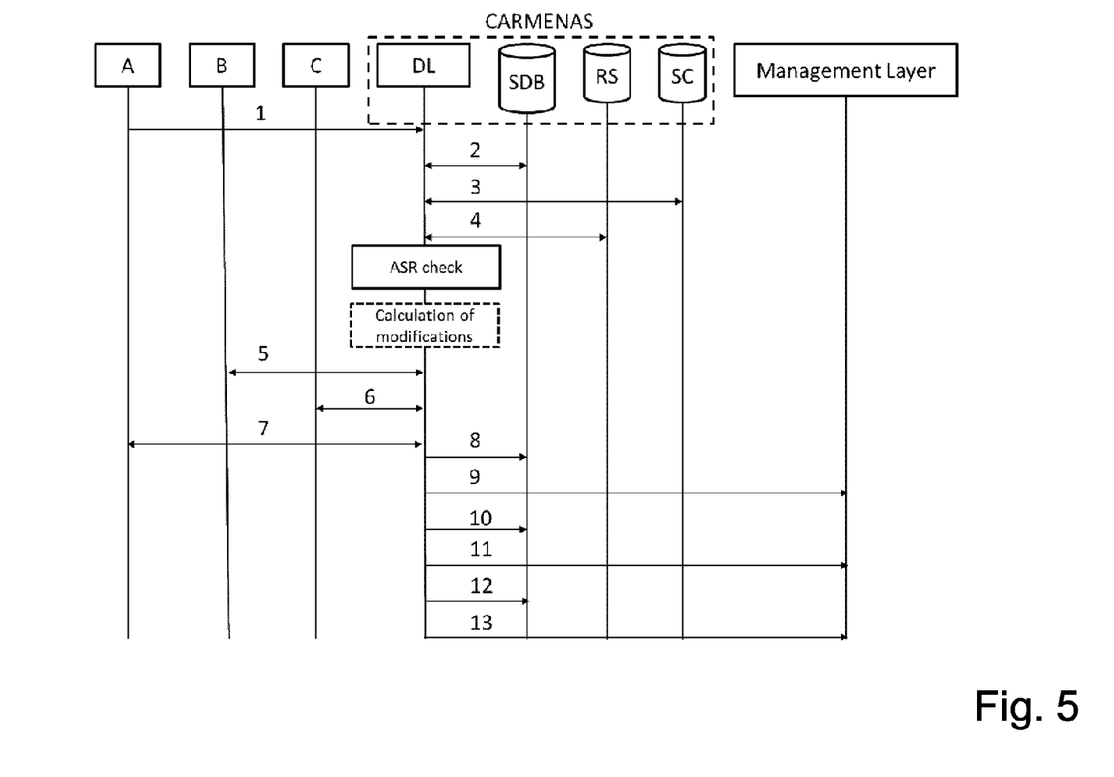
FIG. 5 shows steps of a method according to a further embodiment of the present invention.

FIG. 5 shows steps of a method according to a further embodiment of the present invention. In FIG. 5 a sequence diagram for the deployment of the CARMENAS method on top of the management layer is shown. Prior to the start of the sequence, there are already served requests by applications B and C.

1. CARMENAS's decision logic DL implementable on a computing entity receives from a requestor A, e.g. a specialized building application a request.
2. CARMENAS fetches from its State Data Base SDB the currently served requests. At present requests from B and C are being served.
3. CARMENAS fetches the consumption characteristics of the system resources associated to the requests from A, B and C from the system characteristics storage SC.

4. CARMENAS retrieves the stored ASR from the rule storage RS.

Thereafter the CARMENAS method checks for any ASR violation. In this sequence it is assumed at least one ASR is being violated. Hence the optional "Calculation of modifications" is executed according to above principles. Here in this exemplary sequence it is assumed that CARMENAS conceives modifications to requests of A, B and C.

5. CARMENAS contacts requestor B about the intended modification to its request. B confirms the suggested modification.
6. CARMENAS contacts requestor C about the intended modification to its request. C confirms the suggested modification.
7. CARMENAS contacts requestor A about the intended modification to its request. A confirms the suggested modification.
8. CARMENAS updates SDB with information regarding the new, i.e. modified, request of A
9. CARMENAS forwards the modified request of A to the Management Layer for enforcement in the building
10. CARMENAS updates SDB with information regarding the modified request of B
11. CARMENAS forwards the modified request of B to the Management Layer for enforcement in the building
12. CARMENAS updates SDB with information regarding the modified request of C
13. CARMENAS forwards the modified request of C to the Management Layer for enforcement in the building This sequence diagram does not show multiple negotiation rounds, rejections of modifications or priorities of rules or systems. Neither it shows the possibility to determine the system characteristics in a context dependent way, e.g. based on external services or based on information the CARMENAS system queries from the management layer.

In a further embodiment the present invention provides a method for mediating control requests in buildings comprising the steps of:

1) Receiving control requests,
2) System specific assessment of control request impact in operational context considering interdependent requests already served affecting a shared resource,
3) Adversary Situation Rule checking and derivation of possible request modifications in case of ASR violations,
4) Negotiation of request modifications with requestors,
5) Enforcement of (modified) requests.

In summary, one or more embodiments of the present invention can enable one or more of the following:

1) Contextual detection of conflicts created by control requests for different service systems, e.g. via shared supply systems or shared bottlenecks
2) Context aware request conflict resolution by adapting already served control requests as well as newly received request.
3) Negotiation of adaptation of control requests to resolve the conflict with requestors (already served requestors and requestor of newly received request).

One or more embodiments of the present invention can provide at least one of the following advantages:

Allows protection against unintended adverse service system interactions by individual application control requests.

Negotiation/modification of requests allows specialist applications to become reactive to building/service system context.

Protects against human errors when adapting individual system configurations in conflict with system design.

Increased efficiency as static rules for e.g. permissible set-point ranges cannot cover all system contexts.

Detection of possibly adverse situations allows to diagnose applications and system configurations Allowing to choose the coincidence factor more optimistically.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating one or more service systems, the method being performed in a memory of an analyzing entity (AE), the method comprising:

a) receiving, by an input interface of the AE, one or more control requests for controlling one or more resources of at least one of the one or more service systems;

b) assessing, by the AE, an impact on the one or more service systems of the one or more control requests by checking an effect on already performed control requests for resources of the one or more service systems when the one or more control requests would be performed on one or more of the resources of the at least one of one or more service systems and evaluating a plurality of operational parameters representing behavior of the one or more service systems and contextual information, wherein the contextual information is one of a day of the week and weather parameters;

c) checking, by the AE, if the assessed impact violates one or more adverse situation rules (ASR), wherein an ASR violation represents a situation of the service system in which at least partly contradicting effects on one or more resources of the one or more service systems would occur due to a performance of the one or more control requests, wherein effects of different control requests are weighed against each other;

d) upon violation of one or more ASR, computing, by the AE to reduce violation of the one or more ASR, one or more adapted control requests for one or more of the control requests and/or one or more of the already performed control requests;

e) negotiating, by the AE, with requestors of the one or more of the control requests and/or the one or more of the already performed control requests, the computed adapted control requests until acceptance is achieved, wherein the negotiating includes one or more recomputed adapted control requests; and f) upon acceptance, transmitting, by the AE, the accepted control requests via an output interface to recipients of the control requests.

2. The method according to claim 1, wherein the operational parameters and/or the contextual information is provided by a neural network and/or a database.

3. The method according to claim 1, wherein for determining an ASR violation, energy consumption constraints are evaluated.

4. The method according to claim 1, wherein an ASR is provided in form of a logical expression of one or more conditions of the one or more service systems which are not permissible.

5. The method according to claim 1, wherein for at least step b) and/or d), sensor information of sensors and actuator information of actuators of resources of the one or more service systems is provided.

6. The method according to claim 5, wherein the sensor information and the actuator information includes energy consumption information of the resources.

7. The method according to claim 1, wherein steps c)-f) are performed for already accepted control requests in pre-defined time-intervals and/or periodically.

8. The method according to claim 1, wherein the operational parameters are evaluated dynamically.

9. The method according to claim 1, wherein the weights are dependent on the time a request is already accepted or on a value of an operational parameter on which the request has an impact or weights are determined based on external information.

10. The method according to claim 1, wherein an algebra is computed to identify possible valid adaptions to control requests.

11. The method according to claim 1, wherein relative importance rankings are determined and used during and for the negotiation.

12. A computing entity, comprising:
an input interface configured to receive one or more control requests for controlling one or more resources of one or more service systems,
an output interface configured to transmit accepted control requests to recipients of the control requests,
a computer comprising a processor and a memory, the computer being configured to:
receive, from the input interface, one or more control requests for controlling one or more resources of at least one of the one or more service systems,
assess the impact on the one or more service systems of the one or more control requests by checking the effect on already performed control requests for resources of the one or more service systems, when the one or more control requests would be performed on one or more of the resources of the at least one of the one or more service systems and evaluating a plurality of operational parameters representing behavior of the one or more service systems and contextual information, wherein the contextual information is one of a day of the week and weather parameters, check if the assessed impact violates one or more adverse situation rules (ASR), wherein an ASR violation represents a situation of the service system in which at least partly contradicting effects on one or more resources of the one or more service systems would occur due to a performance of the one or more control requests, wherein effects of different control requests are weighed against each other, compute, upon violation of one or more ASR, one or more adapted control requests for one or more of the control requests and/or one or more of the already performed control requests, the computing being directed to reduce violation of the ASR, negotiate with requestors of the one or more of the control requests and/or the one or more of the already performed control requests, the computed adapted control requests until acceptance is achieved, wherein the negotiating includes one or more recomputed adapted control requests, and transmit the accepted control requests via the output interface to the recipients of the control requests.

13. A non-transitory computer readable medium storing a program configured, when executed, to cause a computer to execute a method for operating one or more service systems, the method comprising:

a) receiving, by an input interface of the AE, one or more control requests for controlling one or more resources of at least one of the one or more service systems;

b) assessing, by the AE, an impact on the one or more service systems of the one or more control requests by checking an effect on already performed control requests for resources of the one or more service systems when the one or more control requests would be performed on one or more of the resources of the at least one of one or more service systems and evaluating a plurality of operational parameters representing behavior of the one or more service systems and contextual information, wherein the contextual information is one of a day of the week and weather parameters;

c) checking, by the AE, if the assessed impact violates one or more adverse situation rules (ASR), wherein an ASR violation represents a situation of the service system in which at least partly contradicting effects on one or more resources of the one or more service systems would occur due to a performance of the one or more control requests, wherein effects of different control requests are weighed against each other;

d) upon violation of one or more ASR, computing, by the AE to reduce violation of the one or more ASR, one or more adapted control requests for one or more of the control requests and/or one or more of the already performed control requests;

e) negotiating, by the AE, with requestors of the one or more of the control requests and/or the one or more of the already performed control requests, the computed adapted control requests until acceptance is achieved, wherein the negotiating includes one or more recomputed adapted control requests; and f) upon acceptance, transmitting, by the AE, the accepted control requests via an output interface to recipients of the control requests.

* * * * *